United States Patent [19]

Klinefelter

[11] Patent Number: 5,793,403
[45] Date of Patent: Aug. 11, 1998

[54] THERMAL PRINT HEAD COMPENSATION

[75] Inventor: Gary M. Klinefelter, Eden Prairie, Minn.

[73] Assignee: Fargo Electronics, Inc., Eden Prairie, Minn.

[21] Appl. No.: 591,694

[22] Filed: Jan. 25, 1996

[51] Int. Cl.$^6$ .................................................. B41J 2/36
[52] U.S. Cl. ............................................................ 347/195
[58] Field of Search ................................. 347/188, 195; 400/120.09, 120.15

[56] References Cited

U.S. PATENT DOCUMENTS

| | | | |
|---|---|---|---|
| 4,168,421 | 9/1979 | Ito | 219/216 |
| 4,284,876 | 8/1981 | Ishibashi et al. | 219/216 |
| 4,709,149 | 11/1987 | Takahasi et al. | 250/317 |
| 4,769,527 | 9/1988 | Hart et al. | 219/216 |
| 4,888,601 | 12/1989 | Inui | 346/76 |
| 5,120,936 | 6/1992 | Shyu et al. | 219/497 |
| 5,170,179 | 12/1992 | Chen et al. | 346/76 |
| 5,220,349 | 6/1993 | Saita et al. | 346/76 |
| 5,308,958 | 5/1994 | Gassho | 219/486 |
| 5,424,767 | 6/1995 | Alavizadeh et al. | 347/17 |

*Primary Examiner*—Huan H. Tran
*Attorney, Agent, or Firm*—Westman, Champlin & Kelly, P.A.

[57] ABSTRACT

A method of controlling a thermal print head having a plurality of resistive heaters to compensate for the effects of latent heat from the resistive heaters is disclosed. The plurality of resistive heaters are arranged in a line on a substrate with each of the plurality of resistive heaters corresponding to a pixel position on a medium such as paper. A compensation value is determined for each pixel in a line such that the effects of latent heat from the corresponding heater and from adjacent heaters are compensated. A compensated gray level for each pixel of the line is calculated as a function of a desired gray level for the particular pixel in the line and as a function of the associated compensation value. Finally, the heaters are driven as a function of the compensated gray levels to print the corresponding pixels of the line.

13 Claims, 5 Drawing Sheets

THERMAL PRINT HEAD COMPENSATION

BACKGROUND OF THE INVENTION

The present invention relates to a thermal printing system and, more particularly, to a method of controlling the heaters on the thermal print head to compensate for the effects of latent heat.

A thermal printing system utilizes a thermal print head which includes a substrate onto which a line of resistive heat-generating elements or heaters is deposited. The resistive heaters are uniformly deposited in a single line and very closely together, typically with a resolution of 203 or 300 heaters per inch. An electric current is selectively and controllably applied to each of the heaters in accordance with the information to be thermally transferred to a corresponding pixel on a piece of paper or other medium adjacent to the thermal print head. Usually, the printing is accomplished by thermal transfer between a ribbon and the piece of paper. However, printing can also be accomplished using thermally sensitive paper. Printing on a medium with a thermal print head can be carried out by a process which generates the desired pattern on the paper one line at a time by selectively energizing the heaters as the paper is transferred past the thermal print head. Individual heaters are energized to levels corresponding to the desired gray levels of the pixels printed by the particular heaters. This is frequently accomplished by energizing the individual heaters repeatedly, with the number of times corresponding to the desired gray levels.

Thermal print heads have a thermal characteristic which adversely affects the quality of the printed image or information. After a single resistive heater is sufficiently energized, a wake of latent heat is produced which is transferred to the same resistive heater when it is energized while printing a subsequent line, and to surrounding resistive heaters to a lesser degree. This thermal characteristic is evident in a printed image as light leading edges, washed-out detail and lack of contrast. Consequently, there is a need for a thermal printing system in which the latent heat effects are adequately compensated to provide an improved printed image.

SUMMARY OF THE INVENTION

The present invention provides a system for and method of controlling a thermal print head having a plurality of resistive heaters to compensate for the effects of latent heat from the resistive heaters. The plurality of resistive heaters are arranged in a line on a substrate with each of the plurality of resistive heaters corresponding to a pixel position on a medium. A compensation value is determined for each pixel or pixel position in a line to be printed such that the effects of latent heat from the heater corresponding to that pixel and from adjacent heaters are compensated. A compensated gray level for each pixel of the line is calculated as a function of a desired gray level for the particular pixel in the line and as a function of the associated compensation value. Finally, the heaters are driven as a function of the compensated gray levels to print the corresponding pixels of the line.

DETAILED DESCRIPTION OF THE PREFERRED EMBODIMENTS

Figure 1:
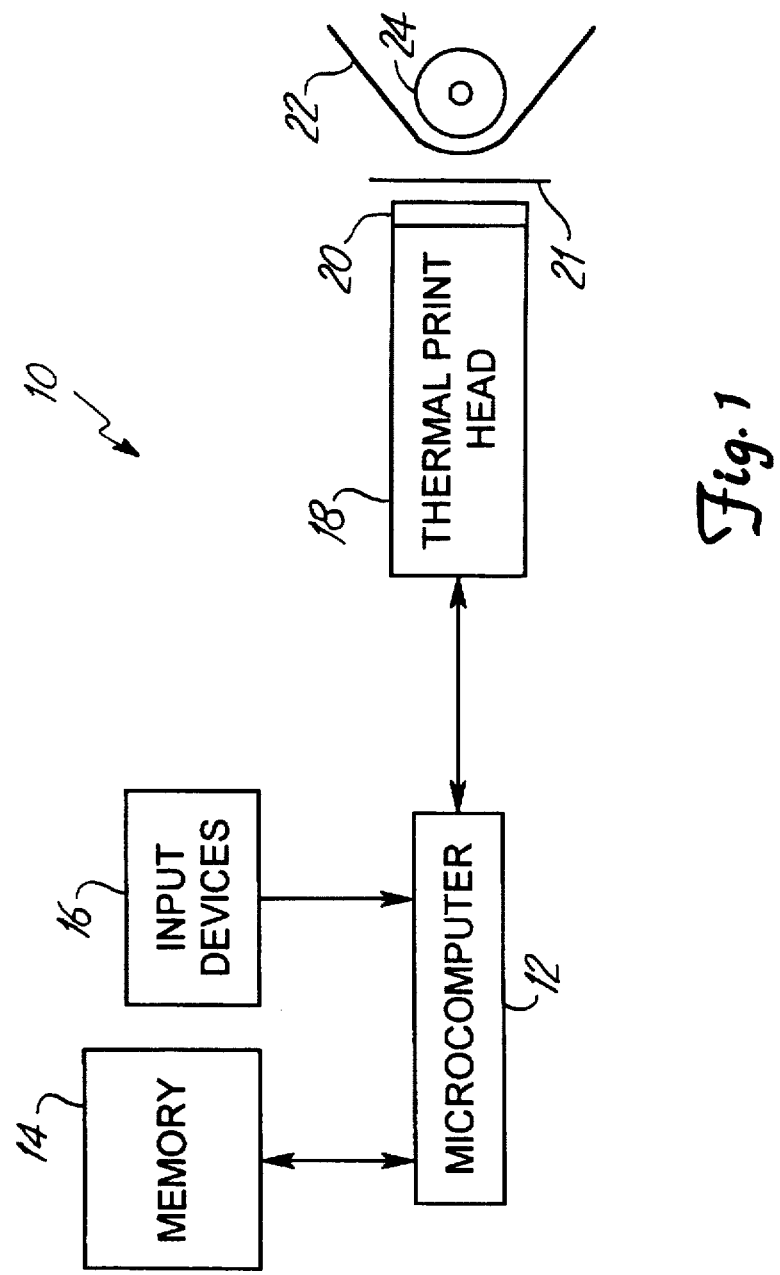
FIG. 1 is a block diagram of a thermal printing system in accordance with preferred embodiments of the present invention.

FIG. 1 illustrates thermal printing system 10 of the present invention. Thermal printing system 10 includes microcomputer 12, memory 14, input devices 16, thermal print head 18 having end 20 which includes a line or array of resistive heaters (shown in FIG. 2), thermally sensitive ribbon 21 and medium 22. Medium 22 is fed across the resistive heaters and ribbon 21 by roller 24. In one embodiment, ribbon 21, which is preferably a dye sublimation or other type ribbon, is omitted and thermal print head 18 prints on a medium which itself is thermally sensitive. Thermal printing system 10 of the present invention utilizes a new method of controlling the degree or duration of energizing individual resistive elements or heaters on thermal print head 18 to achieve a desired gray level. In some preferred embodiments, controlling the degree or duration of energizing individual heaters is implemented by controlling the number of times the individual heaters are energized while printing a particular line.

Microcomputer 12 is preferably a microprocessor-based device of a type well-known in the art. However, in other embodiments, microcomputer 12 can be any analog or digital circuitry capable of implementing the preferred method of the present invention. Memory 14 is coupled to microcomputer 12 and can be any of a large variety of conventional data storage devices for temporarily and/or permanently storing data for use by microcomputer 12. In other embodiments, memory 14 can be integrated within microcomputer 12 instead of being a separate device. Input devices 16 are coupled to microcomputer 12 and can be any of a wide variety of devices adapted for providing information and/or control data to microcomputer 12. For instance, input devices 16 can include one or more of a keyboard, a keypad entry device, and/or another system adapted for providing information to microcomputer 12. The configuration of thermal printing system 10 as shown in FIG. 1 is chosen for ease of illustration of the invention. It must be noted that, in preferred embodiments, a separate personal computer is utilized to process data according to the methods of the present invention. The data is then transferred to a microcomputer or microcontroller associated with the print head for actual control of the print head.

Thermal print head 18 is of the type well-known in the art having a line of resistive heaters on end 20. Each of the resistive heaters on end 20 of thermal print head 18 corresponds to one pixel position in each line to be printed on medium 22. In other words, each resistive heater is associated with one corresponding pixel on each line being printed on medium 22. Microcomputer 12 is coupled to thermal print head 18 and controls the individual heaters to selectively print pixels one line at a time as medium 22 is advanced past the line of resistive heaters and past ribbon 21 by roller 24. The achieved gray level of individual pixels printed on a particular line is controlled by controlling the intensity and/or duration of heat generated by the corresponding heater on thermal print head 18.

For every pixel on a page, a desired gray level GRAYIN [n] (where n corresponds to a particular resistive heater and to the corresponding pixel in a particular line) for that pixel is known and is provided to microcomputer 12 from either input devices 16 or from memory 14. When referring to the desired gray level GRAYIN[n] for a pixel corresponding to the nth heater in a particular line, it is not intended to imply that all pixels corresponding to the nth heater in all lines will have the same desired gray level. Rather, it is understood that the nth pixel in different lines can have different desired gray levels and that GRAYIN[n] is meant to refer to the desired gray level of the particular line in question. The desired gray level could therefore also be described as a two dimensional storage array such as GRAYIN[l,n] wherein ln represents the pixel position and 1 represents the line. However, to simplify the illustration of embodiments of the invention, the line number is not noted throughout the remainder of the application.

As discussed in greater detail with reference to the flow diagrams of FIGS. 3–5, microcomputer 12 uses the method of the present invention to calculate compensated gray levels GRAYOUT[n] for each pixel on the page to compensate for the effects of latent heat. Microcomputer 12 then drives or controls print head 18 as a function of the compensated gray levels to achieve an improved printed image by minimizing light leading edges, washed-out detail and lack of contrast in the image. Once the compensated gray levels GRAYOUT[n] have been determined, any of a variety of different known methods of controlling the print head can be used, with the compensated gray levels replacing the desired gray levels GRAYIN[n], to achieve the desired gray levels on the medium.

Figure 2:
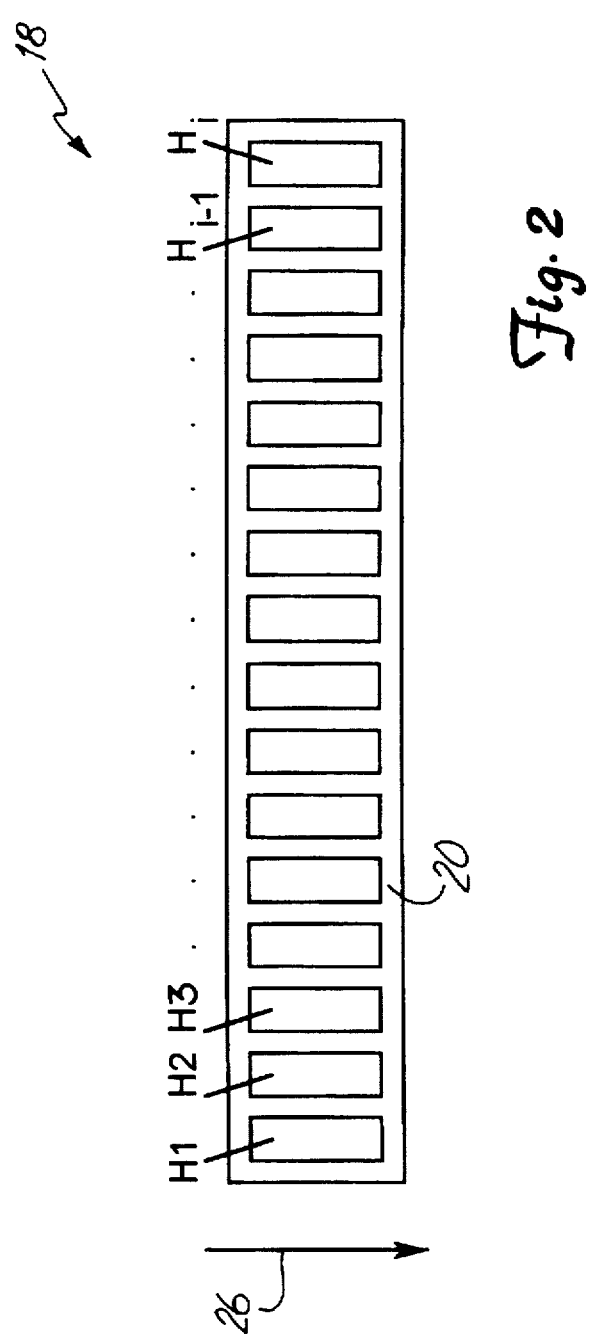
FIG. 2 is a diagrammatic end view of the thermal print head shown in FIG. 1 which illustrates the line of resistive heaters and the direction of paper travel along the thermal print head.

FIG. 2 is a diagrammatic view of end 20 of thermal print head 18. On end 20, thermal print head 18 includes a line or row of adjacent resistive heaters, $H_1$ through $H_i$ (where i is equal to the number of heaters on thermal print head 18 and therefore is also equal to the number of pixels per line to be printed on medium 22). Medium 22 (shown in FIG. 1) is advanced past stationary print head 18 and ribbon 21 in the direction denoted by arrow 26 while resistive heaters $H_1$ through $H_i$ each print their respective pixel in each line. In this manner, thermal print head 18 prints one line of a page at a time.

Thermal print heads such as print head 18 have a thermal characteristic which adversely affects the quality of printing. After a single resistive heater is energized, a wake of latent heat is produced which is transferred to the same resistive heater the next time it is energized for printing a subsequent line. To a lesser degree, the wake of latent heat is also transferred to surrounding resistive heaters. This thermal characteristic is evident in a printed image as light leading edges, washed-out detail and lack of contrast. The present invention includes a method of compensating for the effects of latent heat in the resistive heaters to improve the quality of the printed image.

Figure 3:
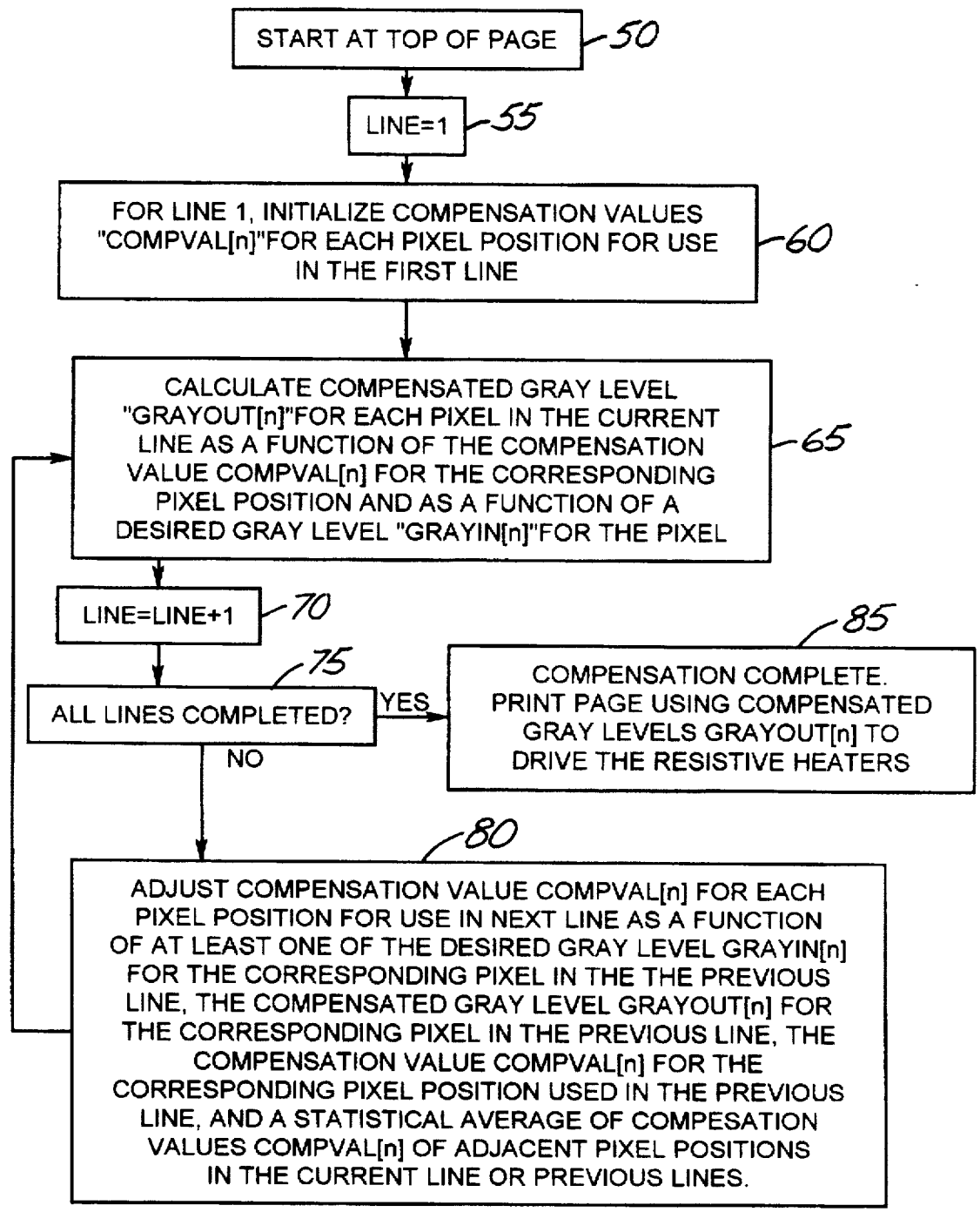
FIG. 3 is a flow diagram illustrating one preferred method of calculating compensated gray scale intensity levels for the pixels which can be used to control the thermal print head to compensate for the effects of latent heat.

FIG. 3 is a flow diagram illustrating one preferred method of compensating for the effects of latent heat from the resistive heaters of thermal print head 18. The method compensates for these effects by calculating a compensated gray level GRAYOUT[n] for each pixel on the page. The method accepts as inputs the desired gray level GRAYIN[n] for each pixel on the page (where n represents the nth pixel in a particular line) and a compensation value COMPVAL[n] corresponding to that pixel. It should once again be noted that GRAYIN[n] is actually a two dimensional array having a desired gray level for each pixel on the page, but that COMPVAL[n] is a one dimensional array having one compensation value for each pixel position (corresponding to all lines) or heater. As is discussed below in greater detail, the compensation value COMPVAL[n] for each heater is repeatedly adjusted for use in the next line. The output of the method is the compensated gray level GRAYOUT[n] for that pixel. After this process is completed, microcomputer 12 drives the resistive heaters H based upon the compensated gray levels GRAYOUT[n] instead of based upon the desired gray levels GRAYIN[n]. For most implementations, it is necessary to add an additional number of output gray levels to the number of input gray levels in order to retain the gray scale resolution.

The method illustrated in FIG. 3 of determining compensated gray levels GRAYOUT[n] for each pixel of the page is described with reference to the steps emphasized below. However, it is clear that FIG. 3 represents only one possible embodiment of the method of the present invention and that many minor changes can be made to the method illustrated in FIG. 3 without departing from the scope of the invention.

Steps 50, 55 and 60

The compensation values COMPVAL[n] used in the method of the present invention are preferably initialized at the top of each page. Making the assumption that, at the start of the page, all of the resistive heaters H are in a cold state, compensation values COMPVAL[n] for each pixel position will be set to their maximum value MAX for use in the first line.

Step 65

Next, the compensated gray levels GRAYOUT[n] for each pixel in the current line (i.e., line 1 initially) are calculated as a function of the compensation value COMPVAL[n] for the corresponding pixel position and as a function of the desired gray level GRAYIN[n]. These compensated gray levels GRAYOUT[n] are later used when determining to what magnitude, for what duration, or how many times the resistive heaters H should be energized to print the desired image while minimizing the undesirable effects of latent heat build-up.

Steps 70 and 75

Since compensation is preferred for all pixels on the page, the method of the present invention increments the line number and determines whether the compensation process has been carried out for all lines on the page. If all lines have not been compensated, the process continues.

Step 80

Next, the compensation value COMPVAL[n] associated with each pixel position is adjusted for use in the next line (or in the current line if the line number has already been incremented as is the case in FIG. 3). The compensation values COMPVAL[n] are adjusted as a function of at least one of the following: (1) the desired gray level GRAYIN[n] for the corresponding pixel position in the previous line, (2) the compensated gray level GRAYOUT[n] for the corresponding pixel in the previous line, (3) the compensation value COMPVAL[n] for the corresponding pixel position used in the previous line, and (4) a statistical average of compensation values COMPVAL[n] of adjacent pixel positions in the previous or current line. Adjusting the compensation value COMPVAL[n] as a function of any of items 1–3 above provides compensation for the effects of latent heat of a particular heater during printing of a pixel in a subsequent line. Adjusting the compensation value COMPVAL[n] as a function of item 4 above provides compensation for the effects of latent heat from surrounding heaters. The method of the present invention next returns to step 65 and the compensated gray levels GRAYOUT[n] for the next line are calculated as described above.

Step 85

Once the process has been carried out for all lines on the page, the page is printed using the compensated gray levels GRAYOUT[n], instead of the desired gray levels GRAYIN [n], to drive the resistive heaters. It must be noted that, if preferred, thermal printing system 10 can begin printing while microcomputer 12 is calculating compensated gray levels GRAYOUT[n] for subsequent lines.

Figure 4A:
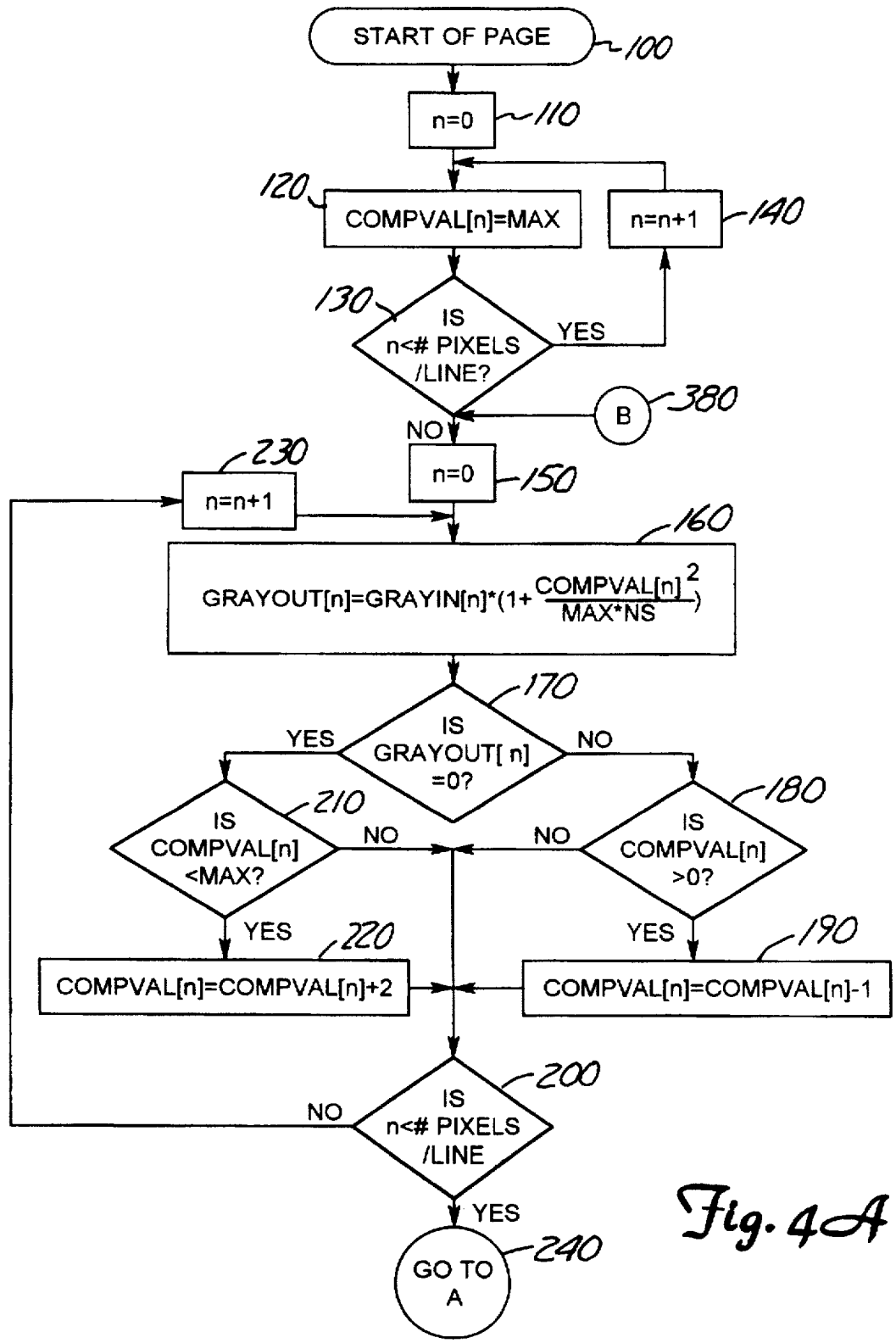
FIGS. 4A and 4B are flow diagrams illustrating a preferred implementation of the method illustrated in FIG. 3 in greater detail.
Figure 4B:
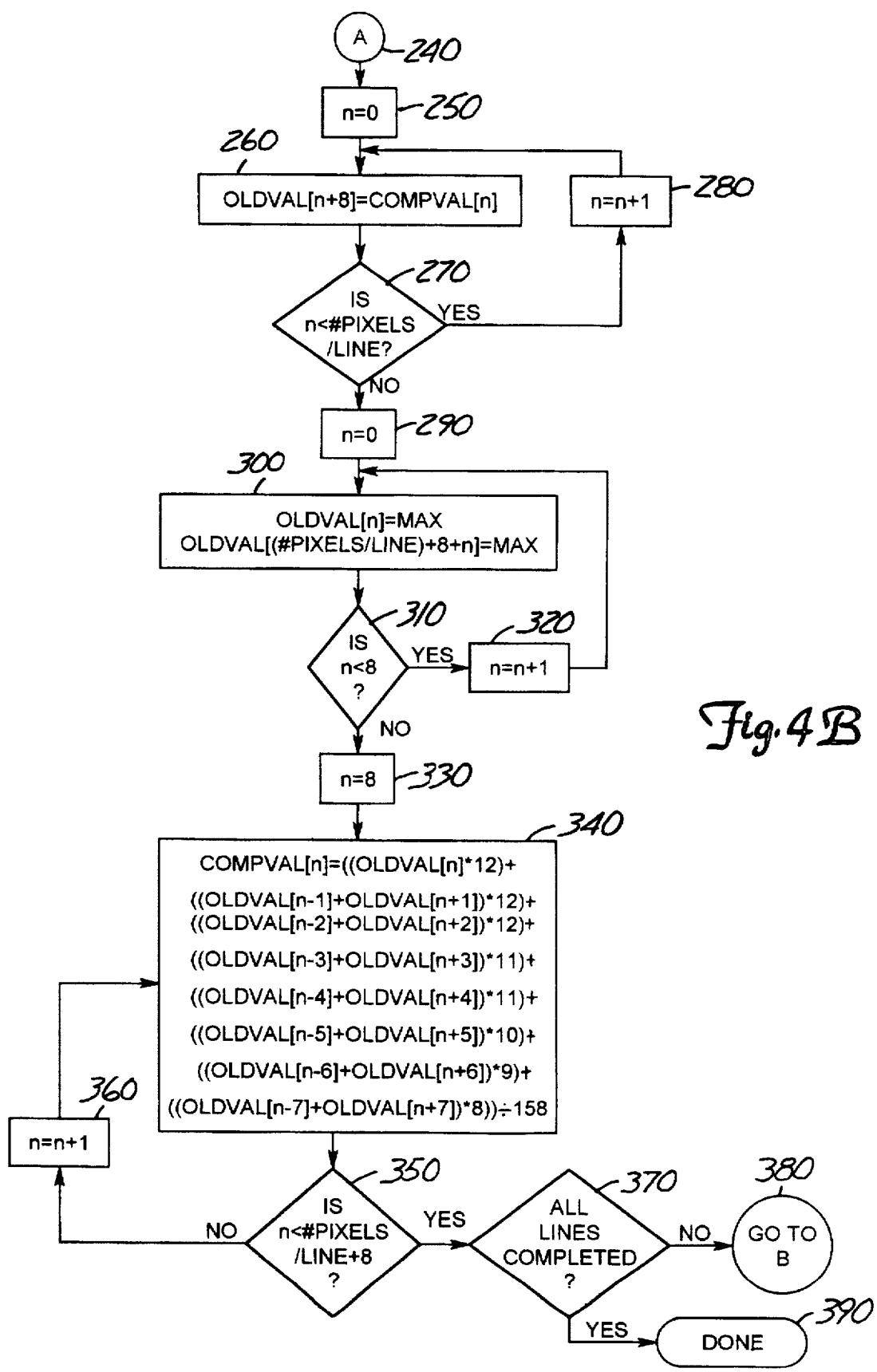

FIGS. 4A and 4B are flow diagrams illustrating one preferred implementation of the method of FIG. 3 in greater detail.

Steps 100, 110, 120, 130 and 140

As discussed above with reference to step 55–60 of FIG. 3, the method of the present invention preferably begins at the top a page to be printed by initializing the compensation values COMPVAL[n] for each pixel position for use in compensating the first line. The initialization preferably sets all of the compensation values COMPVAL[n] to their maximum value MAX indicating cold pixels.

Step 150

The variable n is set to zero to begin compensation on the first pixel (pixel 0) in the current line (i.e., the first line initially and subsequent lines as the method progresses).

Step 160

Compensated gray level GRAYOUT[n] or the nth pixel (i.e., the first pixel initially and subsequent pixels as the method progresses) in the first line is calculated as a function of the desired gray level GRAYIN[n] for that pixel and as a function of the compensation value COMPVAL[n] associated with that pixel. In preferred embodiments, GRAYOUT [n] is calculated according to Equation 1.

$$GRAYOUT[n] = GRAYIN[n] * \left(1 + \frac{COMPVAL[n]^2}{MAX*NS}\right) \quad \text{Equation 1}$$

where

NS=the number of GRAYIN levels or shades possible minus 1.

Steps 170, 180, 190, 210 220 and 230

Next, after calculating the compensated gray level for a particular pixel in a particular line, compensation value COMPVAL[n] for the corresponding pixel position is adjusted for eventual use in printing a pixel at the same pixel position in the next line. In other words, COMPVAL[n] is adjusted for use in compensating the nth heater the next time it will potentially be energized during printing of the next line.

If GRAYOUT[n] was equal to zero, indicating that the heater was not turned on and is still cold, it is determined whether COMPVAL[n] is equal to its maximum possible value of MAX. In the first line, COMPVAL[n] will be equal to MAX because of the initialization step. However, in subsequent lines, COMPVAL[n] may not equal MAX. If COMPVAL[n] is less than MAX, then it is incremented by two (in step 220), and the method returns to step 160 after the variable n is incremented (in step 230) for calculating a compensated gray level GRAYOUT[n] for the next pixel in the current line.

If GRAYOUT[n] was not equal to zero (in step 170), indicating that the nth heater was or will be at least partially energized during the printing of the current line, COMPVAL [n] is decreased in value (in step 190) if COMPVAL[n] is greater than zero.

This process of calculating compensated gray levels GRAYOUT[n] for each pixel in the current line and adjusting the compensation values corresponding to each pixel position COMPVAL[n] for use in the next and/or subsequent lines is continued for all of the pixels in the current line. This process compensates for the effect that latent heat from individual heaters will have on the printed image the next time and/or subsequent times the individual heater is energized.

Step 240

Once the above compensation and adjustment process for all of the pixels in the current line have been completed, the method of the present invention again adjusts (in steps shown in FIG. 4B) the compensation values COMPVAL[n] for use with the next line and/or subsequent lines to compensate for the effect of latent heat from adjacent heaters.

Steps 250, 260, 270 and 280

For each pixel in the current line, the compensation value COMPVAL[n] is stored in a corresponding position OLDVAL[n+8] of a temporary storage array in memory 14. These temporarily stored compensation values OLDVAL[n+ 8], are later used to compensate COMPVAL[n] based upon a statistical average of compensation values COMPVAL[n] of adjacent pixels or heaters. By storing COMPVAL[n] in OLDVAL[n+8], pixels at the end of a row or line will be compensated based upon a statistical average, despite the fact that there may not actually be any pixels to one side to consider in the averaging process.

Steps 290, 300, 310, 320 and 330

Next, for n between 0 and 7, OLDVAL[n] and OLDVAL [(#pixels/line)+8+n] are set equal to the maximum value MAX indicating pixels that are cold.

Steps 340, 350, and 360

Next, COMPVAL[n] for each pixel in the line, plus COMPVAL[n] for 8 imaginary pixels beyond the end of the line, are calculated using the weighted statistical averaging formula described in step 340. This adjusts COMPVAL[n] to compensate for latent heat from adjacent heaters.

Steps 370 and 380

If compensated gray levels GRAYOUT[n] for the pixels in all of the lines of the page to be printed have not been calculated, then the process begins again for the next line at step 150 (FIG. 4A). With the exception of compensated gray levels GRAYOUT[n] in the first line, compensated gray levels GRAYOUT[n] in all lines are calculated such that both the effects of latent heat from a particular heater in a previous line and the effects of latent heat from adjacent heaters are compensated.

Step 390

When compensation for all lines is completed, microcomputer 12 drives the heaters H of thermal print head 18 based upon the compensated gray levels GRAYOUT[n] instead of based upon the desired gray levels GRAYIN[n] of the corresponding pixels in the lines to be printed.

The method of the present invention can be adjusted for different print head speeds and constructions. The maximum compensation value MAX can be changed to accommodate different print speeds. Generally, MAX will be made smaller for slower print speeds and larger for faster print speeds. Additionally, the formula for the normal distribution curve used (in step 340 of FIG. 4B) to average each compensation value can be altered by either using more pixels to either side, or by changing the weight assigned to compensation values of adjacent pixels.

Although the present invention has been described with reference to preferred embodiments, workers skilled in the art will recognize that changes may be made in form and detail without departing from the spirit and scope of the invention. For example, the method of determining compensated gray levels of the present invention can be used with any of a variety of known thermal printing systems which print on any of a variety of mediums. Further, while the thermal print head has been described as the type having a single row of resistive heaters, the present invention can be applied to thermal print heads having a column of resistive heaters and/or to a thermal print head having multiple rows of resistive heaters. Likewise, heaters of types other than resistive can be used with the present invention as well. Additionally, the compensated gray level may be used as an input to the compensation value adjustment.

What is claimed is:

1. A method of controlling a thermal print head, having a plurality of resistive heaters, to compensate for the effects of latent heat from the resistive heaters, the plurality of resistive heaters being arranged in a line on a substrate with each of the plurality of resistive heaters corresponding to a pixel position on a medium and selectively printing a pixel at the pixel position in lines on the medium, the thermal print head printing a first line and then subsequently printing a second line on the medium, the method comprising:

determining a compensation value for each pixel in the second line, wherein determining a compensation value for each pixel in the second line includes determining a compensation value for a particular pixel in the second line as a function of compensation values of pixels in the first line adjacent to the pixel position associated with the particular pixel;

calculating a compensated gray level for each pixel in the second line, the compensated gray level for a particular pixel in the second line being calculated as a function of a desired gray level for the particular pixel in the second line and as a function of the compensation value associated with the particular pixel in the second line; and driving the resistive heaters, to print the pixels of the second line, as a function of the respective compensated gray levels for the pixels in the second line.

2. The method of claim 1, wherein the step of determining a compensation value for the particular pixel in the second line as a function of compensation values of pixels in the first line adjacent to the pixel position of the particular pixel includes determining the compensation value for the particular pixel in the second line as a function of a statistical average of compensation values of pixels in the first line adjacent to the pixel position associated with the particular pixel.

3. The method of claim 1, wherein the step of determining a compensation value for each pixel in the second line further includes determining the compensation value for the particular pixel in the second line as a function of a desired gray level for a corresponding pixel in the first line, the corresponding pixel in the first line corresponding to the same resistive heater as the particular pixel in the second line.

4. The method of claim 3, wherein the step of determining the compensation value for the particular pixel in the second line as a function of a desired gray level for the corresponding pixel in the first line includes determining the compensation value for the particular pixel in the second line as a function of a compensated gray level for the corresponding pixel in the first line.

5. The method of claim 1, wherein the step of determining a compensation value for each pixel of the second line further includes determining the compensation value for the particular pixel in the second line as a function of a compensation value for a corresponding pixel in the first line, the corresponding pixel in the first line corresponding to the same resistive heater as the particular pixel in the second line.

6. The method of claim 5, wherein determining the compensation value for the particular pixel in the second line as a function of a compensation value for a corresponding pixel in the first line further includes setting the compensation value for the particular pixel in the second line equal to the compensation value for the corresponding pixel in the first line plus a predetermined quantity if both a calculated compensated gray level for the corresponding pixel in the first line was equal to a minimum gray level and if the compensation value for the corresponding pixel in the first line was less than a maximum compensation value.

7. The method of claim 5, wherein determining the compensation value for the particular pixel in the second line as a function of a compensation value for a corresponding pixel in the first line further includes setting the compensation value for the particular pixel in the second line equal to the compensation value for the corresponding pixel in the first line minus a predetermined quantity if both a calculated compensated gray level for the corresponding pixel in the first line was greater than a minimum gray level and if the compensation value for the corresponding pixel in the first line was greater than zero.

8. The method of claim 1, wherein the step of calculating a compensated gray level for each pixel includes calculating the compensated gray level for a particular pixel according to the relationship $$GRAYOUT = GRAYIN * \left(1 + \frac{COMPVAL^2}{MAX*NS}\right)$$

where GRAYOUT is equal to the compensated gray level for the particular pixel, GRAYIN is equal to the desired gray level for the particular pixel, COMPVAL is equal to the compensation value for the particular pixel, MAX is equal to a maximum value of the compensation value COMPVAL, and NS is a number which is one less than the number of possible grayscale levels for the particular pixel.

9. A thermal printing system having a thermal print head which includes a plurality of heaters, the plurality of heaters being arranged in a line on a substrate with each of the plurality of heaters corresponding to a pixel position on a medium and selectively printing a pixel at the pixel position in lines on the medium, the thermal print head printing a first line and then subsequently printing a second line on the medium, the thermal printing system comprising:

means for determining a compensation value for each pixel in the second line by determining a compensation value for a particular pixel in the second line as a function of compensation values of pixels in the first line adjacent to the pixel position associated with the particular pixel;

means for calculating a compensated gray level for each pixel in the second line, the compensated gray level for a particular pixel in the second line being calculated as a function of a desired gray level for the particular pixel in the second line and as a function of the compensation value associated with the particular pixel in the second line; and means for driving the heaters, to print the pixels of the second line, as a function of the respective compensated gray levels for the pixels in the second line.

10. The thermal printing system of claim 9, wherein the means for determining the compensation value for the particular pixel in the second line as a function of compensation values of pixels in the first line adjacent to the pixel position of the particular pixel includes means for determining the compensation value for the particular pixel in the second line as a function of a statistical average of compensation values of pixels in the first line adjacent to the pixel position associated with the particular pixel.

11. The thermal printing system of claim 9, wherein the means for determining a compensation value for each pixel in the second line further includes means for determining the compensation value for the particular pixel in the second line as a function of a desired gray level for a corresponding pixel in the first line, the corresponding pixel in the first line corresponding to the same resistive heater as the particular pixel in the second line.

12. The thermal printing system of claim 11, wherein the means for determining the compensation value for the particular pixel in the second line as a function of a desired gray level for the corresponding pixel in the first line includes means for determining the compensation value for the particular pixel in the second line as a function of a compensated gray level for the corresponding pixel in the first line.

13. The thermal printing system of claim 9, wherein the means for determining a compensation value for each pixel of the second line further includes means for determining the compensation value for the particular pixel in the second line as a function of a compensation value for a corresponding pixel in the first line, the corresponding pixel in the first line corresponding to the same resistive heater as the particular pixel in the second line.

* * * * *